(12) United States Patent
Colban

(10) Patent No.: US 7,689,214 B2
(45) Date of Patent: Mar. 30, 2010

(54) EFFICIENT SHARING OF MOBILE EQUIPMENT IDENTIFIERS

(75) Inventor: Erik Colban, San Diego, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 767 days.

(21) Appl. No.: 11/343,712

(22) Filed: Jan. 31, 2006

(65) Prior Publication Data
US 2007/0082669 A1 Apr. 12, 2007

Related U.S. Application Data

(60) Provisional application No. 60/725,381, filed on Oct. 11, 2005.

(51) Int. Cl.
*H04W 4/00* (2009.01)
(52) U.S. Cl. .............. 455/433; 455/455; 455/435.1
(58) Field of Classification Search ........... 455/403, 455/410, 411, 414.1, 414.2, 415, 424, 425, 455/433, 435.1, 456.1, 458, 558
See application file for complete search history.

(56) References Cited

U.S. PATENT DOCUMENTS

| | | | |
|---|---|---|---|
| 6,178,337 B1* | 1/2001 | Spartz et al. ............... 455/561 |
| 6,225,888 B1* | 5/2001 | Juopperi ................... 340/5.8 |
| 6,377,791 B1* | 4/2002 | Pirila ....................... 455/410 |
| 7,043,263 B2* | 5/2006 | Kaplan et al. ............. 455/466 |
| 2002/0191562 A1* | 12/2002 | Kumaki et al. ............ 370/331 |
| 2004/0147242 A1* | 7/2004 | Pasanen et al. ........... 455/403 |
| 2005/0014481 A1* | 1/2005 | Chin et al. ................ 455/403 |
| 2005/0181773 A1* | 8/2005 | Chang .................... 455/414.1 |
| 2005/0192017 A1* | 9/2005 | Choi et al. ................ 455/450 |
| 2006/0194605 A1* | 8/2006 | Sinnarajah et al. ....... 455/550.1 |

FOREIGN PATENT DOCUMENTS

WO WO01/11911 A1 2/2001

OTHER PUBLICATIONS

3rd Generation Partnership Project 2 "3GPP2", "Mobile Station Equipment Identifier (MEID) Support for cdma2000 Spread Spectrum Systems," 3GPP2 C.S0072, Version 1.0, Revision 0, Jul. 22, 2005.
"Project No. 3-0218, proposed creation of a new TIA Standard MEID for cdma2000 Spread Spectrum Systems (if approved, to be published as TIA-1082)," May 23, 2005, Telecommunications Industry Association 2004, XP17005055.

* cited by examiner

*Primary Examiner*—Jean A Gelin
(74) *Attorney, Agent, or Firm*—Coats & Bennett, P.L.L.C.

(57) ABSTRACT

In a mobile communication network, the base station is configured to query the mobile station for its mobile equipment identifier if not provided by the mobile switching center before traffic channel setup. The base station may send the mobile equipment identifier to the mobile switching center during call setup.

15 Claims, 6 Drawing Sheets

| Information Element | Section Reference | Element Direction | Type |
|---|---|---|---|
| Message Type | 4.2.4 | MSC -> BS | M |
| Mobile Identity (IMSI/ESN) | 4.2.13 | MSC -> BS | M$^a$ |
| Tag | 4.2.46 | MSC -> BS | O$^h$ / C |
| Cell Identifier List | 4.2.18 | MSC -> BS | O$^b$ / C |
| Slot Cycle Index | 4.2.14 | MSC -> BS | O$^{c,f}$ / C |
| Service Option | 4.2.49 | MSC -> BS | O$^{d,k}$ / R |
| IS-2000 Mobile Capabilities | 4.2.53 | MSC -> BS | O$^{e,f,i}$ / C |
| Protocol Revision | 4.2.79 | MSC -> BS | O$^g$ / C |
| MS Designated Frequency | 4.2.88 | MSC -> BS | O$^{f,e}$ / C |
| A2p Bearer Format-Specific Parameters | 4.2.90 | MSCe -> BS | O$^j$ / C |
| Mobile Identity (MEID) | 4.2.13 | MSC -> BS | O$^l$ / C |
| Mobile Subscription Information | 4.2.91 | MSC -> BS | O$^m$ / C |

*FIG. 4*

| Information Element | Section Reference | Element Direction | Type | |
|---|---|---|---|---|
| Message Type | 4.2.4 | MSC -> BS | M | |
| Channel Type | 4.2.6 | MSC -> BS | $M^a$ | |
| Circuit Identity Code | 4.2.19 | MSCcs -> BS | $O^b$ | C |
| Encryption Information | 4.2.10 | MSC -> BS | $O^c$ | C |
| Service Option | 4.2.49 | MSC -> BS | $O^d$ | R |
| Signal | 4.2.38 | MSCcs -> BS | $O^{e,f,}$ | C |
| MS Information Records | 4.2.55 | MSC -> BS | $O^g$ | C |
| Priority | 4.2.15 | MSC -> BS | $O^j$ | C |
| PACA Timestamp | 4.2.67 | MSC -> BS | $O^h$ | C |
| Quality of Service Parameters | 4.2.41 | MSC -> BS | $O^i$ | C |
| Service Option Connection Identifier (SOCI) | 4.2.73 | MSC -> BS | $O^k$ | C |
| Service Reference Identifier (SR_ID) | 4.2.86 | MSC -> BS | $O^l$ | C |
| A2p Bearer Session-Level Parameters | 4.2.89 | MSCe -> BS | $O^{m,o}$ | C |
| A2p Bearer Format-Specific Parameters | 4.2.90 | MSCe -> BS | $O^{n,o}$ | C |
| Mobile Identity (MEID) | 4.2.13 | MSC -> BS | $O^p$ | C |
| Mobile Subscription Information | 4.2.91 | MSC -> BS | $O^q$ | C |

FIG. 5

| Information Element | Section Reference | Element Direction | Type | |
|---|---|---|---|---|
| Message Type | 4.2.4 | BS -> MSC | M | |
| Channel Number | 4.2.5 | BS -> MSC | M[c] | |
| Encryption Information | 4.2.10 | BS -> MSC | O[a] | C |
| Service Option | 4.2.49 | BS -> MSC | O[b] | R |
| Service Option Connection Identifier (SOCI) | 4.2.73 | BS -> MSC | O[d] | C |
| A2p Bearer Session-Level Parameters | 4.2.89 | BS -> MSCe | O[e, g] | C |
| A2p Bearer Format-Specific Parameters | 4.2.90 | BS -> MSCe | O[f, g] | C |
| Mobile Identity (MEID) | 4.2.13 | BS->MSC | O[h] | C |

EFFICIENT SHARING OF MOBILE EQUIPMENT IDENTIFIERS

RELATED APPLICATIONS

This application claims the benefit of U.S. Provisional Patent Application 60/725,381 filed Oct. 11, 2005, which is incorporated herein by reference.

BACKGROUND

Regulations passed by the Federal Communications Commission (FCC) in the mid 1980s require each handset in the United States to have a unique identifier. Currently, mobile phones are identified by a 32-bit number called the Electronic Serial Number (ESN). Due to rapid growth in wireless communications, the ESN space is being rapidly exhausted. By some estimates, the ESN space will be completely exhausted by 2007.

Recognizing the prospect of ESN exhaustion, the CDMA industry has defined a new identifier called the Mobile Equipment Identifier (MEID), which is introduced in Release D of the cdma2000 standards (IS-2000-D). However, systems implementing Release D are not expected to be deployed in the near future. Due to the anticipated exhaustion of ESNs, there is great interest in transitioning to the MEID before TIA-2000-D systems are deployed.

In 2005, the Third Generation Partnership Project 2 (3GPP2) introduced a new air interface standard to accommodate the introduction of mobile stations equipped with MEIDs. The standard is published as 3GPP2 C.S0072, also known as TIA-1082, which is incorporated herein by reference. This standard allows deployed releases (Releases 0, A, B, C) of the cdma200 standard to use a limited set of features in Release D to support the MEID. The MEID is used by the circuit-switched core network to identify the mobile station and may also be used by the packet-switched core network for accounting purposes. The mobile station generates a pseudo ESN (pESN) based on its MEID for use in access messages. The pESN has the same format as a ESN. If the network has implemented TIA-1082 and supports the MEID, the network may query the mobile station to determine its MEID. Because different MEIDs may yield the same pESN, the circuit-switched core network may use the pESN and International Mobile Station Identifier (IMSI) to identify the mobile station, or query the mobile station for its MEID. The packet-switched network may use the pESN and IMSI to identify the mobile station for accounting purposes. The MEID may be stored by the circuit-switched core network and sent to the base station.

In conventional networks, ESNs are normally used to derive public long code masks (PLCMs). In systems that support the MEID, the PLCM may be derived from the MEID or pESN. If the pESN is used to derive the PLCM, there is a possibility that multiple mobile stations will have the same pESN. To avoid problems caused by duplicate pESNs, the new standard also allows the base stations to assign PLCMs to mobile stations. The PLCM may be sent to the mobile station in either an Enhanced Channel assignment Message (ECAM) or Universal Handoff Direction Message (UHDM). The new standard also provides a means for the network to query the mobile station to determine its MEID.

Both the base station and the Mobile Switching Center (MSC) in cdma2000 networks may initiate a status inquiry to the mobile station to retrieve the MEID. A method is needed to allow the MSC and BS to share this information to avoid implementations where each node (e.g., base station or MSC) relies on the other to initiate a status inquiry and the MEID not being retrieved, or where each node autonomously initiates the status inquiry resulting in unnecessary signaling over the air. Since the MEID may be useful both to the base station (to forward toward the Packet Data Serving Node (PDSN) for accounting purposes) and to the MSC (for purposes of identification of the mobile station), the MEID retrieved by one node should be communicated to the other node.

SUMMARY

The present invention provides a method and apparatus to coordinate the acquisition of the MEID of a mobile station by a serving base station and a MSC. During call setup, the MSC may provide the MEID of the mobile station to the base station in a call setup message. If the MEID is not provided by the MSC in a call setup message, the base station sends a request message to the mobile station requesting the MEID of the mobile station. The request message may be sent by the base station either before or after traffic channel setup. When the base station receives the MEID from the mobile station in a response message, the base station may send the MEID of the mobile station to the MSC in a call setup message. In one exemplary embodiment for cdma2000 systems, the base station sends the MEID in the Assignment Complete message after the traffic channel is established if not earlier received from the MSC in either a Paging Request message of Assignment Request message.

BRIEF DESCRIPTION OF THE DRAWINGS

FIG. 4 illustrates the general format used for a paging request message.

FIG. 5 illustrates the general format used for an assignment request message.

FIG. 6 illustrates the general formal used for an assignment complete message.

DETAILED DESCRIPTION

Figure 1:
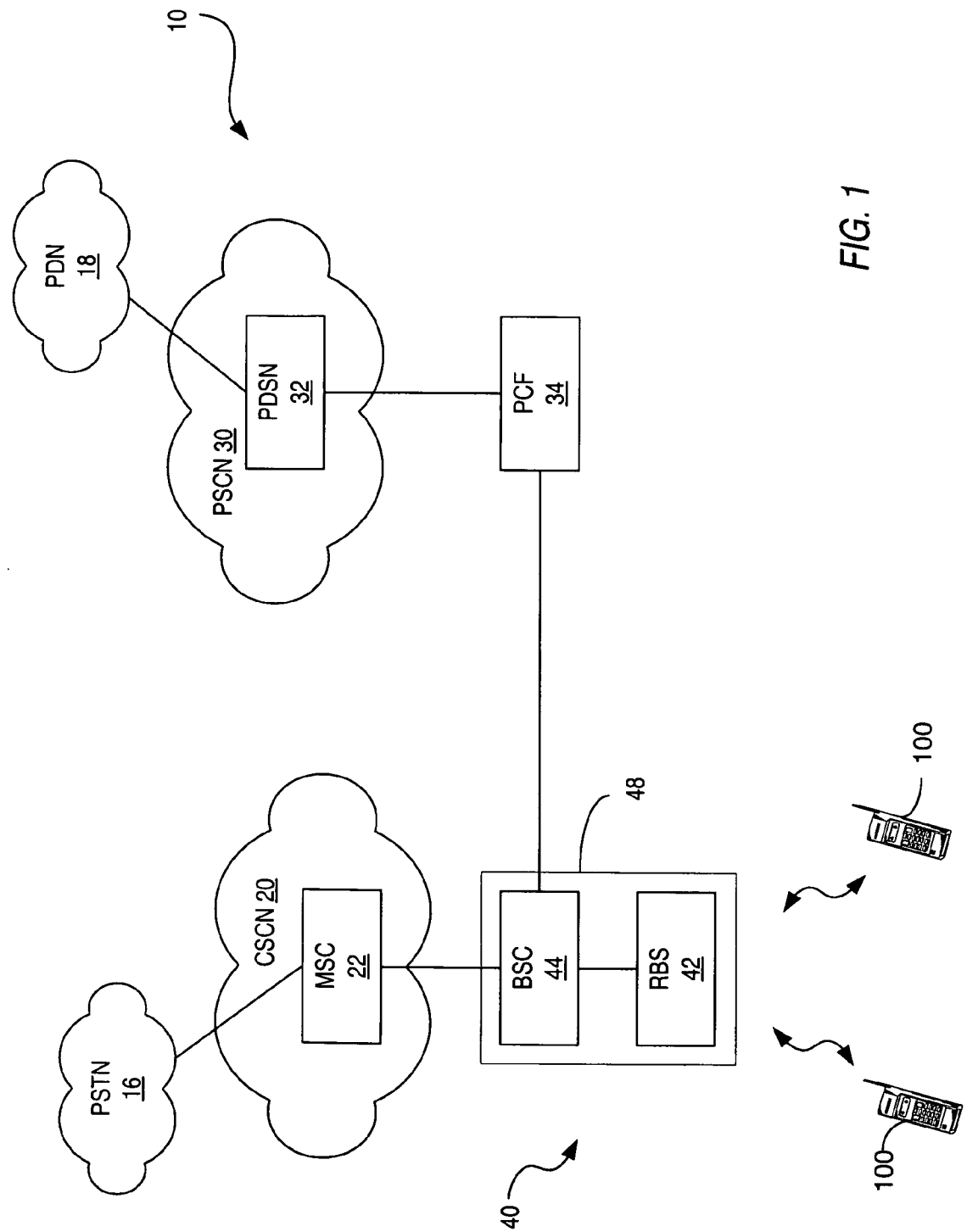
FIG. 1 is a functional block diagram illustrating the main components of an exemplary wireless communication network.

FIG. 1 illustrates logical entities of an exemplary wireless communication network 10 for providing mobile communication services to a plurality of mobile stations 100. FIG. 1 illustrates a network 10 configured according to the cdma2000 air interface and interoperability standards. More specifically, the exemplary embodiment incorporates the Interoperability Specification (IOS) for cdma2000 Access Network Interfaces—Part 4 (A1, A1p, A2, and A5 Interfaces) (3GPP2 A.S0014-C v2.0), which is incorporated herein by reference. However, those skilled in the art will appreciate that the present invention could be adapted and employed in systems using other communication standards including the Wideband Code Division Multiple Access (WCDMA) and High Rate Packet Data (HRPD) standards.

Network 10 comprises a circuit-switched core network 20, a packet-switched core network 30, and one or more radio access networks (RANs) 40. The CSCN 20 provides primarily voice services and low rate data services, such as facsimile services, to the mobile stations 100. The CSCN 20 includes a mobile switching center (MSC) 22 and provides a connection to the public switched telephone network (PSTN) 16. The PSCN 30 may provide voice and high speed packet data services. The PSCN 30 includes a packet data serving node (PDSN) 32 and connects to an external packet data network (PDN) 18, such as the Internet. The PDSN 32 supports PPP connections to and from the mobile stations 100. The RANs 40 provide access to the core networks 20, 30. The main RAN functions include establishing, maintaining and terminating radio channels for communication with the mobile stations 100; radio resource management; and mobility management.

Each RAN 20 comprises one or more radio base stations (RBSs) 42, one or more base station controllers (BSCs) 44. If the RAN 20 supports packet data services, the RAN further includes one or more Packet Core Functions (PCFs) 46. The PCFs 46 may be integrated with BSCs 44 though shown separately in FIG. 1. Each RBSs 42 includes a plurality of transmitters and receivers for communicating over the air interface with mobile stations 100. Each RBS 24 is located in and provides service to a geographic region referred to as a cell. In general there is one RBS 24 in a cell, but a cell could include multiple RBSs 24. The cell may be a sectorized cell that is divided into a number of sectors. A single RBS 24 in a cell may serve all sectors in the cell. The BSCs 44 manage radio resources for one or more RBSs 42. In cdma2000 networks, an RBS 42 and a BSC 44 comprise a base station 48. The RBS 42 is the part of the base station 48 that includes the radio equipment and is normally associated with a cell. The BSC 44 is the control part of the base station 48. In cdma2000 networks, a single BSC 44 may comprise the control part of multiple base stations 48. The PCF 46 connects the RAN 20 to the PDSN 32 and routes traffic between the PDSN 32 and the BSCs 44.

The mobile stations 100 may be equipped with a mobile equipment identifier (MEID) which is defined in Release D of the cdma2000 standard. The MEID uniquely identifies the mobile station 100 and replaces the electronic serial number (ESN) used in previous mobile stations 100. The present invention provides a method implemented by a base station 48 to acquire the MEID of a mobile station 100 during call setup, and to share the MEID with the MSC 22. The base station 48 is configured to query the mobile station 100 during call setup to acquire the MEID of the mobile station 100 if the MEID is not provided by the mobile switching center 22 in either a Paging Request message or Assignment Request message. After acquiring the MEID from the mobile station 100, the base station 48 sends the MEID to the MSC 22 in an Assignment Complete message.

Figure 2:
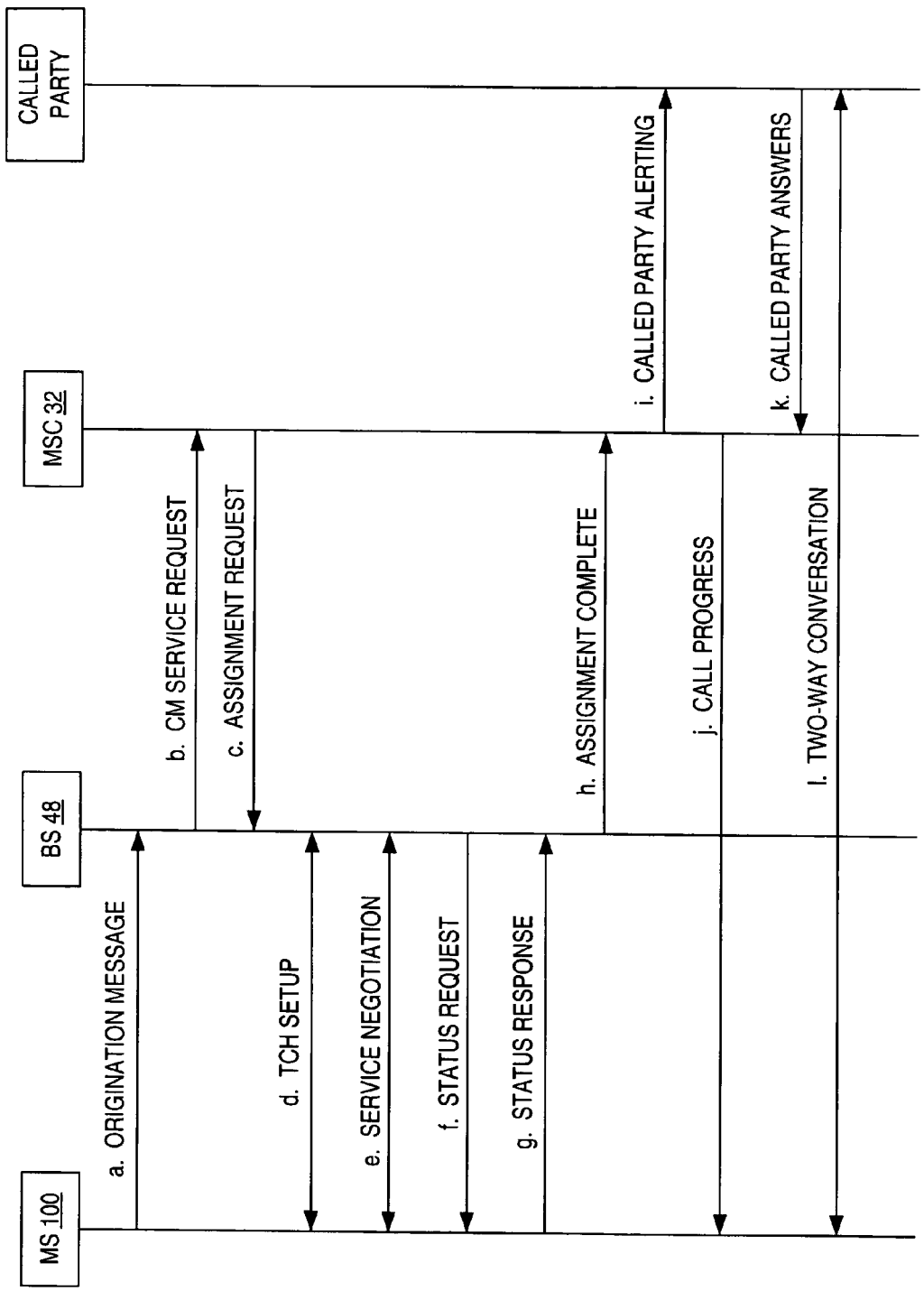
FIG. 2 is a call flow diagram illustrating an exemplary mobile originated call establishment procedure.

FIG. 2 illustrates a mobile-originated call establishment procedure for establishing a voice call originated by the mobile station 100 according to one exemplary embodiment. The mobile station 100 sends an Origination message (step a) to the base station 48 to initiate the call. The base station 48 forwards the information contained in the Origination message to the MSC 22 in a CM Service Request message (step b). After authenticating the mobile station 100, the MSC 22 routes the call to the Public Switched Telephone Network (PSTN) 16 and sends an Assignment Request message to the base station 48 to request assignment of radio resources to the mobile station 100 (step c). The Assignment Request message is specified in Section 3.1.7 of the cdma200 interoperability standard (3GPP2 A.S0014-C v2.0) and may contain the MEID of the mobile station 100 if this value is already available to the MSC 22, e.g., the MSC 22 stored the MEID received during a previous access attempt. After receiving the Assignment Request message from the MSC 22, the base station 48 establishes forward and reverse link traffic channels with the mobile station 100 (step d) and negotiates service parameters with the mobile station 100 (step e). After the service negotiation is complete, the base station 48 may send a Status Request message (step f) to the mobile station 100 to request the MEID of the mobile station 100. The mobile station 100 may send a Status Response message (step g) to the base station 48 including the MEID. Steps f and g are not performed if the Assignment Request message from the MSC 22 to the base station 48 includes the MEID of the mobile station 100. After receipt of the Status Response message at step g, or after completion of service negotiation at step e, the MSC 22 sends an Assignment Complete message to the MSC 22 (step h). The Assignment Complete message is specified in Section 3.1.8 of the cdma2000 interoperability standard (3GPP2 A.S0014-C v2.0). If the Assignment Request message did not include the MEID, the base station 48 includes the MEID in the Assignment Complete message. The MSC 22 alerts the called party (step i) and generates call progress tones (step j), which are sent inband to the mobile station 100. When the called party answers (step k), the MSC 22 stops sending the tones and connects the call (step l). The parties are now connected and can participate in a two-way conversation.

Figure 3:
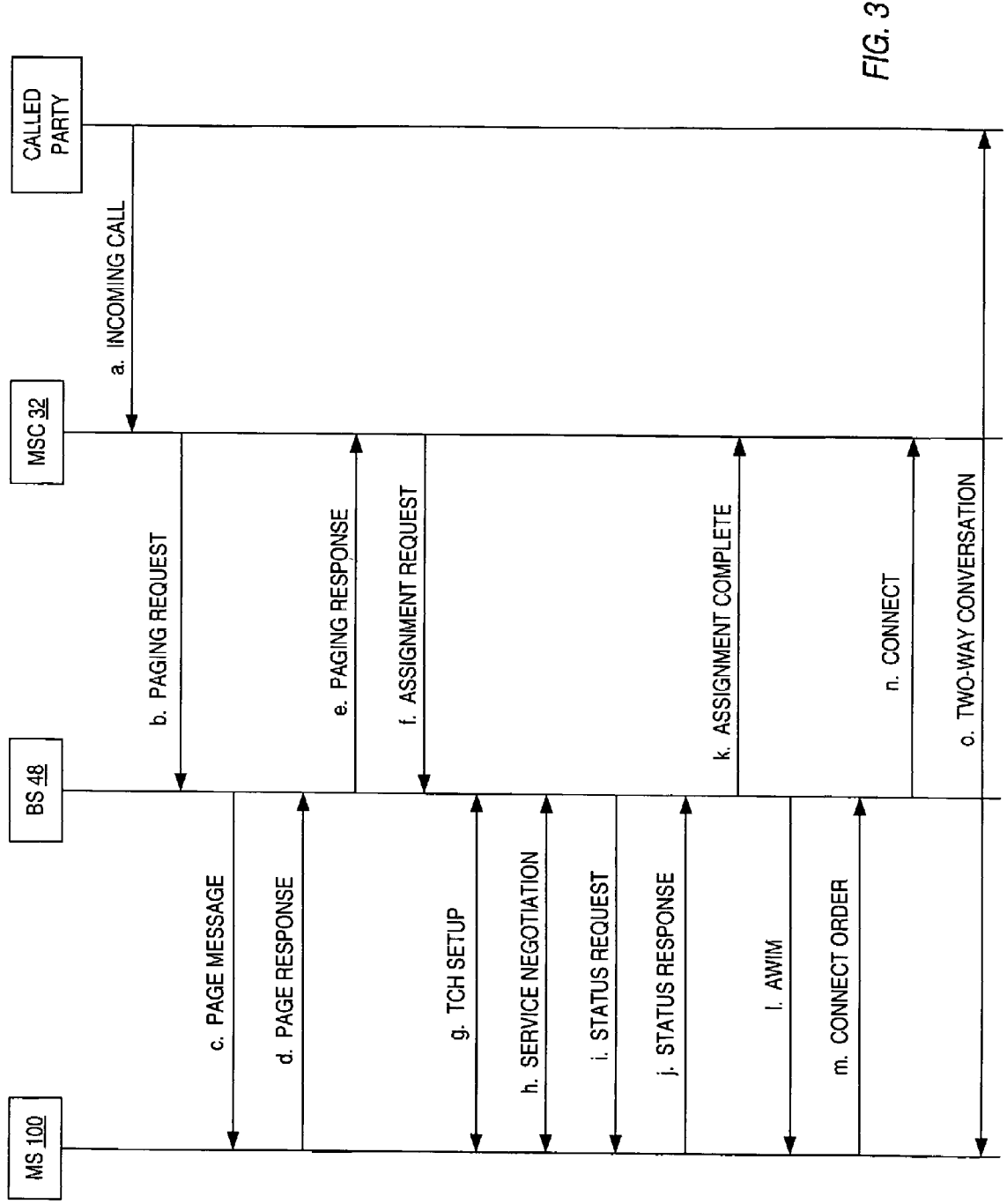
FIG. 3 is a call flow diagram illustrating an exemplary mobile terminated call establishment procedure.

FIG. 3 illustrates a mobile-terminated call establishment procedure for establishing a voice call to the mobile station 100 according to one exemplary embodiment. The MSC 22 receives an incoming call (step a) and sends a Paging Request message to the mobile station 100 (step b). The Paging Request message is specified in Section 3.1.4 of the cdma2000 interoperability standard (3GPP2 A.S0014-C v2.0) and may include the MEID of the mobile station 100 if this value is already available to the MSC 22. The base station 48 sends a Page message to the mobile station 100 to alert the mobile station 100 (step c). The mobile station 100 sends a Page Response message to the base station 48 to accept the call (step d). The base station 48, in turn, sends a Paging Response message to the MSC 22 (step e). The Paging Response message is specified in Section 3.1.5 of the cdma2000 interoperability standard (3GPP2 A.S0014-C v2.0). After receiving the Paging Response message, the MSC 22 sends an Assignment Request message to the base station 48 to request assignment of radio resources to the mobile station 100 (step f). After receiving the Assignment Request message from the MSC 22, the base station 48 establishes forward and reverse link traffic channels with the mobile station 100 (step g) and negotiates service parameters with the mobile station (step h). After the service negotiation is complete, the base station 48 sends a Status Request message (step i) to the mobile station 100 to request the MEID of the mobile station 100 if the Paging Request message received from the MSC 22 did not include the mobile station MEID. The mobile station 100 sends a Status Response message (step j) to the base station 48 including the MEID. Steps i and j are not performed if the Paging Request message from the MSC 22 to the base station 48 includes the MEID of the mobile station 100. After receiving the Status Response message at step j, or after completion of service negotiation at step h, the base station 48 sends an Assignment Complete message to the MSC 22 (step k). The Assignment Complete message includes the MEID of the mobile station 100 if not provided by the MSC 22 in the Paging Request message. After sending the Assignment Complete message, the base station 48 sends an Alert With Information message (AWIM) directing the mobile station 100 to alert the user to the incoming call (step l). When the user answers, the mobile station 100 sends a Connect Order to the base station 48 (step m). The base station 48 sends a Connect message to the base station 48 to complete the call (step n). The parties are now connected and can participate in a two-way conversation (step o).

FIGS. 2 and 3 illustrate exemplary embodiments of the invention implemented in procedures to setup voice calls in a cdma2000 network. The techniques described can also be applied to call setup procedures for setting up a packet data call in cdma2000 networks. For packet data calls, the Status Request and Status Response message exchange can be performed in parallel with other signaling procedures and, thus, does not extend the time required for call setup. Also, the techniques described could be implemented in other types of networks.

FIGS. 4-6 illustrate exemplary formats for the Paging Request message, Assignment Request message, and Assignment Complete message respectively. The references to sections in the Figures refer to 3GPP2 A.S0014-C v2.0 (TIA-2001-D). Each of these messages includes an optional information element to carry the MEID if the MEID is being transmitted. This information element is omitted when the MEID is not transmitted.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A call setup method implemented by a base station in a mobile communication network, said method comprising:
    setting up a traffic channel with the mobile station responsive to a call setup message;
    conditionally sending a request message to said mobile station to request a mobile equipment identifier if not provided to the base station by a mobile switching center in a call setup message received at the base station before traffic channel setup,
    receiving a response message including said mobile equipment identifier from said mobile station in reply to said request message; and
    forwarding said mobile equipment identifier to a mobile switching center.

2. The method of claim 1 wherein the base station sends the request message to the mobile station if the mobile switching center fails to provide the mobile equipment identifier in a paging request message during a mobile-terminated call setup.

3. The method of claim 1 wherein the base station sends the request message to the mobile station if the mobile switching center fails to provide the mobile equipment identifier in at least one of a paging request message or an assignment request message during a mobile-terminated call setup.

4. The method of claim 1 wherein the base station sends the request message to the mobile station if the mobile switching center fails to provide the mobile equipment identifier in an assignment request message during a mobile-originated call setup.

5. The method of claim 1 wherein the base station sends the request message before traffic channel setup.

6. The method of claim 1 wherein the base station sends the request message after traffic channel setup.

7. The method of claim 1 wherein forwarding said mobile equipment identifier to said mobile switching center comprises sending the mobile equipment identifier to the mobile switching center in an assignment complete message after traffic channel setup.

8. A base station for a mobile communication network, comprising:
    one or more transceivers for communicating with mobile stations; and
    a base station controller to control said transceivers and configured to:
        set up a traffic channel with the mobile station responsive to receipt of a call setup message;
        conditionally sending a request message to said mobile station to request a mobile equipment identifier if not provided to the base station by a mobile switching center before traffic channel setup,
        receive a response message from said mobile station including said mobile equipment identifier in reply to said request message; and
        forward said mobile equipment identifier to said a mobile switching center.

9. The base station of claim 8 wherein the base station controller sends the request message to the mobile station if the mobile switching center fails to provide the mobile equipment identifier in a paging request message during a mobile-terminated call setup.

10. The base station of claim 8 wherein the base station sends the request message to the mobile station if the mobile switching center fails to provide the mobile equipment identifier in at least one of a paging request message or an assignment request message during a mobile-terminated call setup.

11. The base station of claim 8 wherein the base station controller sends the request message to the mobile station if the mobile switching center fails to provide the mobile equipment identifier in an assignment request message during a mobile-originated call setup.

12. The base station of claim 8 wherein the base station controller is configured to forward said mobile equipment identifier to said mobile switching center by sending the mobile equipment identifier to the mobile switching center in an assignment complete message after traffic channel setup.

13. The base station of claim 8 wherein the base station sends the request message before traffic channel setup.

14. The base station of claim 8 wherein the base station sends the request message after traffic channel setup.

15. A call setup method implemented by a base station in a cdma2000 network, said method comprising:
    setting up a traffic channel with the mobile station responsive to a call setup message;
    conditionally sending a Status Request Message to said mobile station to request a mobile equipment identifier if not provided to the base station by a mobile switching center in either a Paging Request message or an Assignment Request message,
    receiving a Status Response Message or Extended Status Response Message including said mobile equipment identifier from said mobile station in reply to said Status Request Message; and
    forwarding said mobile equipment identifier to said a mobile switching center in an Assignment Complete message.

* * * * *